U S008316090B2

(12) United States Patent
Addante

(10) Patent No.: US 8,316,090 B2
(45) Date of Patent: Nov. 20, 2012

(54) SYSTEMS AND METHODS FOR COMMUNICATING LOGIC IN E-MAIL MESSAGES

(75) Inventor: Frank Addante, Redwood Shores, CA (US)

(73) Assignee: StrongMail Systems, Inc., Redwood Shores, CA (US)

( * ) Notice: Subject to any disclaimer, the term of this patent is extended or adjusted under 35 U.S.C. 154(b) by 0 days.

(21) Appl. No.: 11/339,906

(22) Filed: Jan. 25, 2006

(65) Prior Publication Data

US 2007/0174398 A1      Jul. 26, 2007

(51) Int. Cl.
G06F 15/16         (2006.01)
(52) U.S. Cl. ........................................ 709/206
(58) Field of Classification Search ................... 709/206, 709/207
See application file for complete search history.

(56) References Cited

U.S. PATENT DOCUMENTS

| 6,192,396 | B1 * | 2/2001 | Kohler | 709/206 |
|---|---|---|---|---|
| 6,519,655 | B1 * | 2/2003 | Pitot et al. | 710/5 |
| 6,577,409 | B1 * | 6/2003 | Barker et al. | 358/468 |
| 7,167,899 | B2 * | 1/2007 | Lee et al. | 709/204 |
| 2003/0018727 | A1 * | 1/2003 | Yamamoto | 709/206 |
| 2003/0135573 | A1 | 7/2003 | Taylor | |
| 2003/0187735 | A1 * | 10/2003 | Francois Olivier | 705/14 |
| 2003/0200145 | A1 * | 10/2003 | Krassner et al. | 705/14 |
| 2004/0006598 | A1 * | 1/2004 | Bargagli Damm et al. | 709/206 |
| 2004/0111478 | A1 * | 6/2004 | Gross et al. | 709/206 |
| 2005/0060381 | A1 * | 3/2005 | Huynh et al. | 709/206 |
| 2005/0108332 | A1 * | 5/2005 | Vaschillo et al. | 709/206 |
| 2005/0210108 | A1 * | 9/2005 | Covert et al. | 709/206 |
| 2006/0036553 | A1 * | 2/2006 | Gupta et al. | 705/52 |
| 2006/0106942 | A1 * | 5/2006 | Shan et al. | 709/240 |
| 2007/0083602 | A1 * | 4/2007 | Heggenhougen et al. | 709/206 |
| 2008/0307063 | A1 * | 12/2008 | Caughey | 709/206 |

FOREIGN PATENT DOCUMENTS

WO          WO 02/13470          2/2002

OTHER PUBLICATIONS

"Simple Mail Protocol (SMTP)," Handbook of Information Security, Chapter 60, John Wiley & Sons, New York, Dec. 2005.
Request for Comments 1939, Post Office Protocol Version 3, May 1996.
Request for Comments 2821, Simple Mail Transfer, Protocol Apr. 2001.
Tzerefos et al., 1997, "A Comparative Study of Simple Mail Transfer Protocol (SMTP), Post Office Protocol (POP) and X.400 Electronic Mail Protocols," IEEE: 545-554.

(Continued)

*Primary Examiner* — Jason Recek
(74) *Attorney, Agent, or Firm* — Morgan, Lewis & Bockius LLP; Brett Lovejoy

(57) ABSTRACT

Computer program products apparatus, and methods for distributing encoded messages to one or more recipients. In one aspect, an electronic request is received using an e-mail protocol. The electronic request includes instructions for accessing one or more destinations corresponding to the recipients and logic for accessing data relating to the recipients. The data relating to recipients is obtained using the logic for accessing the data in the electronic request. For each respective recipient, a message body of a message corresponding to said respective recipient is formatted using the data relating to the respective recipient thereby constructing the one or more encoded messages. The one or more encoded messages are then distributed to the recipients using the one or more corresponding destinations.

44 Claims, 5 Drawing Sheets

OTHER PUBLICATIONS

Siddiqui et al., 2003, "Incorporating Dynamic Behavior in SMTP," IEEE: 1293-1297.

Process Software et al: "PMDF System Manager's Guide" Online, Sep. 2001; pp. 33-1-33-7.

SuperSpeed Software Inc. White Paper: "Increasing Performance in the Mission Critical Environment" SuperSpeed, Nov. 29, 2001, pp. 1-12.

International Search Report dated Mar. 6, 2008 for International Application No. PCT/US07/01969.

Chiu, 2004, "E-mail appliances shore up security," 21, 39.

Garretson, 2005, "IronPort aims high with e-mail security appliance," *Network World*, 22, 19-20.

Horwitt, 1995, "The e-mail must go through," *Network World*, 12, 53-54.

Hunter, 1988, "Two X.400 E-Mail Handlers," *Network World*, 5, 47.

Ohlsohn et al., 1997, "Lotus releases final cc:Mail version, turns focus to Domino," *InfoWorld* 19, 66.

EPO, Supplementary European Search dated Sep. 21, 2009 for application EP07762556.

* cited by examiner

SYSTEMS AND METHODS FOR COMMUNICATING LOGIC IN E-MAIL MESSAGES

1. FIELD OF THE INVENTION

Systems and methods for encoding and interpreting logic encoded in e-mail messages are provided. More particularly, computer systems and methods for encoding logic in order to send personalized interactive digital messages are provided.

2. BACKGROUND OF THE INVENTION

Electronic mail (e-mail) is an essential network service. Most e-mail systems that send mail over the Internet use simple mail transfer protocol (SMTP) to send messages from one server to another. The messages can then be retrieved with an e-mail client using services such as post office protocol (POP) or Internet message access protocol (IMAP). Other protocols for sending e-mail include POP3, X.400 International Telecommunication Union standard (X.400), and the Novell message handling service (MHS), and extended simple mail transfer protocol (ESMTP). Specifically, X.400 defines a transfer protocol for sending electronic mail between mail servers and is used in Europe as an alternative to SMTP. MHS, which was developed by Novell, is used for electronic mail on Netware networks.

SMTP transports electronic mail among different hosts within the transmission control protocol/Internet protocol (TCP/IP) suite. Under SMTP, a client SMTP process opens a TCP connection to a server SMTP process on a remote host and attempts to send mail across the connection. The server SMTP listens for a TCP connection on a specific port (25), and the client SMTP process initiates a connection on that port. When the TCP connection is successful, the two processes execute a simple request-response dialogue, defined by the SMTP protocol (see RFC 821 STD 10, Simple mail transfer protocol, August 1982, for details), in which the client process transmits the mail addresses of the originator and the recipient(s) for a message. When the server process accepts these mail addresses, the client process transmits the e-mail instant message. The e-mail message contains a message header and message text ("body") formatted in accordance with RFC 822 (RFC822 STD 11, Standard for the format of ARPA—Internet Text Messages, August 1982). Mail that arrives via SMTP is forwarded to a remote server or it is delivered to mailboxes on the local server. On UNIX-based systems, Sendmail is the most widely used SMTP server for e-mail. Sendmail includes a POP3 server and also comes in a version for Windows NT. Microsoft Outlook is the most popular mail-agent program on Window-based systems.

The SMTP model (RFC 821) supports both end-to-end (no intermediate message transfer agents "MTAs") and store-and-forward mail delivery methods. The end-to-end method is used between organizations, and the store-and-forward method is chosen for operating within organizations that have TCP/IP and SMTP-based networks. A SMTP client will contact the destination host's SMTP server directly to deliver the mail. It will keep the mail item from being transmitted until it has been successfully copied to the recipient's SMTP. This is different from the store-and-forward principle that is common in many other electronic mailing systems, where the mail item may pass through a number of intermediate hosts in the same network on its way to the destination and where successful transmission from the sender only indicates that the mail item has reached the first intermediate hop. The RFC 821 standard defines a client-server protocol. The client SMTP is the one which initiates the session (that is, the sending SMTP) and the server is the one that responds (the receiving SMTP) to the session request. Because the client SMTP frequently acts as a server for a user-mailing program, however, it is often simpler to refer to the client as the sender-SMTP and to the server as the receiver-SMTP. An SMTP-based process can transfer electronic mail to another process on the same network or to another network via a relay or gateway process accessible to both networks. An e-mail message may pass through a number of intermediate relay or gateway hosts on its path from a sender to a recipient.

A simple model of the components of the SMTP system is shown in FIG. 1. Users deal with a user agent (UA). Popular user agents for UNIX include Berkeley Mail, Elm, MH, Pine, and Mutt. The user agents for Windows include Microsoft Outlook/Outlook Express and Netscape/Mozilla Communicator. The exchange of e-mail using TCP is performed by an MTA. The most common MTA for UNIX systems is Sendmail, and a conventional MTA for Windows is Microsoft Exchange 2000/2003. Users normally do not deal with the MTA. It is the responsibility of the system administrator to set up the local MTA. Users often have a choice, however, for their user agent. The local MTA maintains a mail queue so that it can schedule repeat delivery attempts in case a remote server is unable. Also the local MTA delivers mail to mailboxes, and the information can be downloaded by the UA (see FIG. 1). The RFC 821 standard specifies the SMTP protocol, which is a mechanism of communication between two MTAs across a single TCP connection. The RFC 822 standard specifies the format of the electronic mail message that is transmitted using the SMTP protocol (RFC 821) between the two MTAs. As a result of a user mail request, the sender-SMTP establishes a two-way connection with a receiver-SMTP. The receiver-SMTP can be either the ultimate destination or an intermediate one (known as a mail gateway). The sender-SMTP will generate commands, which are replied to by the receiver-SMTP (see FIG. 1).

Both the SMTP client and server have two basic components: UA and local MTA. There are few cases of sending electronic-mail messages across networks. In the first case of communication between the sender and the receiver across the network (see FIG. 1), the sender's UA prepares the message, creates the envelope, and puts message in the envelope. The MTA transfers the mail across the network to the TCP-port 25 of the receiver's MTA. In the second case of communication between the sending host (client) and the receiving host (server), relaying could be involved (see FIG. 2). In addition to one MTA at the sender site and one at the receiving site, other MTAs, acting as client or server, can relay the electronic mail across the network. This third scenario of communication between the sender and the receiver can be accomplished through the use of an e-mail gateway, which is a relay MTA that can receive electronic mail prepared by a protocol other than SMTP and transform it to the SMTP format before sending it. The e-mail gateway can also receive electronic mail in the SMTP format, change it to another format, and then send it to the MTA of the client that does not use the TCP/IP protocol suite. In various implementations, there is the capability to exchange mail between the TCP/IP SMTP mailing system and the locally used mailing systems. These applications are called mail gateways or mail bridges. Sending mail through a mail gateway may alter the end-to-end delivery specification, because SMTP will only guarantee delivery to the mail-gateway host, not to the real destination host, which is located beyond the TCP/IP network. When a mail gateway is used, the SMTP end-to-end transmission is host-to-gateway, gateway-to-host or gateway-to-gateway; the behavior beyond the gateway is not defined by SMTP.

E-mail across SMTP, or the other protocols references above, is used extensively today to communicate relevant personalized information. For example, a company needs to frequently communicate to each of its numerous consumers with relevant personalized e-mail. In such a situation, companies often maintain information specific to each of its customers or clients in a data repository, such as customer databases, data files, customer relationship management (CRM) systems, and the like. One approach for communicating with all of these customers is to send personalized individual, batch, or bulk e-mail through an e-mail distributor or high-throughput mail transfer agent (MTA) system.

A mail transfer agent or MTA (also called a mail server, or a mail exchange server in the context of the Domain Name System) is a computer program or software agent that transfers electronic mail messages from one computer to another. Webster's New World *Computer Dictionary*, tenth edition, Wiley Publishing Inc., Indianapolis, Ind., defines an MTA as an e-mail program that sends e-mail messages to another message transfer agent. An MTA can handle large amounts of mail, can interact with databases in many formats, and has extensive knowledge of the many SMTP variants in use. Examples of high-throughput MTA systems are disclosed in U.S. patent application Ser. No. 10/857,601, entitled "Email Delivery System Using Metadata," filed May 27, 2004 as well as U.S. patent application Ser. No. 10/777,336, entitled "Email Using Queues in Non-persistent memory," filed Feb. 11, 2004, each of which is hereby incorporated by reference in its entirety. One example of an MTA system is the Strong-Mail MTA (Redwood Shores, Calif.). Conventional MTA programs include, but are not limited to, sendmail, qmail, Exim, and Postfix.

High-throughput MTA systems such as those described above are more powerful than conventional MTA programs. Both high-throughput and conventional MTA products can send out messages to a plurality of recipients. However, while functional, existing MTA systems are unsatisfactory. To illustrate why, consider the case in which company A wishes to communicate with existing or past customers. The company maintains a record of each of these customers in a company database. Such records may contain personalized information about each of the customers. Company A wishes to use this information in order to customize each of the e-mails. To accomplish this, a method for accessing the customer information in the database needs to be arranged. Separately, the design of the e-mail that will be sent to each customer in the distribution list needs to be created. Therefore, at a minimum, what is needed is coordination between an information technology (IT) specialist and a business development professional in order to configure data from one or more sources to create messages to be delivered using the MTA distribution.

An IT specialist is consulted in order to provide a secure method for querying the database containing customer information. For instance, the IT specialist might set up an account with limited database privileges as well as construct scripts with customized database queries in order to obtain the information for each customer. At a minimum, such information will include an e-mail address for each customer. In more powerful examples, the names of the customers are identified, as well as other information such as the types of products the customer has bought in the past, geographic information, information about the customer payment history, how often the customer buys products, how much product the customer buys, and so forth. Thus, it is clear that an IT specialist is needed in conventional MTA based distribution efforts each time a business development professional designs a new e-mail for distribution using an MTA. The role of the business development professional is to optimize the persuasiveness and effectiveness of the customized MTA distribution. The work of the business development professional involves choosing fonts, color schemes and art that will be used in the customized e-mail sent to a plurality of recipients. The work of the business development professional further involves making decisions about which customers will receive a customized e-mail. The business development professional can, for example, select customers as a function of geographic region, amount of product bought from the company during a predetermined time period, etc. Thus, close coordination between the business development professional and the IT specialist is needed for each business development project that involves the distribution of customized electronic messages using an MTA.

The business development example provided above is just one example of the many applications that can be implemented using e-mail. Other applications include providing secure custom statements (e.g., banking statements), person-to-person customized e-mail, traceable e-mails, e-mails from customer service to existing customers, e-mails from an employer to an employee, etc. However, conventional user agents do not provide satisfactory methods for supporting such features. As the example above shows, complex steps are necessary in order to support such applications. Accordingly, given the above background, what are needed in the art are improved systems and methods for generating and interpreting customized e-mail messages for distribution.

Discussion or citation of a reference herein will not be construed as an admission that such reference is prior art to the present invention.

3. SUMMARY OF THE INVENTION

The present invention addresses many of the shortcomings and drawbacks found in the prior art. In the present invention logic is encoded into e-mail messages sent from a client computer using the SMTP, POP3, X.400, ESMTP, or MHS protocols or logical variants thereof (e.g., e-mail messages sent using programs similar to or derived from SMTP, POP3, X.400, ESMTP or MHS). The logic encoded by such e-mail is processed by an MTA, in accordance with the present invention. Examples of the logic that can be encoded in the e-mail (herein termed the "electronic request") includes but is not limited to the use of variables, branch conditions (e.g., if then else), loop conditions (e.g., for loop), customized database queries and the like. By processing the logic encoded in the e-message at the MTA housed on a server, rather than on the client, resources readily accessible to the server, but not the client, can be queried in a highly customizable manner in order to produce highly customizable e-mail. Such procedures have application in a broad array of e-mail applications, including but not limited to, customized business develop e-mail, secure custom statements (e.g., banking statements), person-to-person customized e-mail, traceable e-mails, e-mails from customer service to existing customers, customer relationship management, e-mails from an employer to an employee, and automated e-mail reports from devices such as appliances.

One aspect of the invention provides systems and methods for encoding instructions to access customer data repositories in order to generate encoded messages, such as e-mail messages, that can be distributed by services such as an MTA. With these systems and methods, an IT professional, for example, sets up an outbound request, such as customized database queries, or web services requests or flat file data access on a one time basis for a business development professional. After this, the business development professional or other worker can create and modify customized electronic requests for mass distribution using services, such as an MTA, without any further need for consultation with an IT professional using any user agent that is designed to send digital messages (e.g. Outlook, Siebel, Hotmail, etc.).

The systems and methods of the present invention make use of existing mail transfer protocols. For example, an electronic request can be forwarded to an MTA using the SMTP protocol (or any of the other mail transfer protocols or their derivatives described above) in order to provide the MTA with all the information necessary to send out highly customized e-mail to one or a plurality of recipients. In one example, such information includes any necessary logic for accessing select data repositories in order to retrieve customer data for personalizing batch e-mail messages. In particular, using the systems and methods of the present invention, a user sends a specialized electronic request to a service such as an MTA. This electronic request is in the form of an e-mail message that can be sent to an MTA by a mail transfer protocol such as SMTP. In some embodiments this electronic request is an EXML message. EXML is a version of XML (eXtensible Markup Language), which is a simplified markup language that is designed for web documents. Like XML, EXML enables users to create their own customized tags to provide functionality not available within HTML. For example, XML supports links that point to multiple documents, as opposed to HTML links, which reference a single destination. XML-like languages facilitate the sharing of data across different systems, particularly systems connected via the Internet. Languages based on XML (for example, RDF/XML, RSS, MathML, XHTML, SVG, and cXML) are defined in a formal way, allowing programs to modify and validate documents in these languages without prior knowledge of their form. Although EXML is used as the predominant example to illustrate the methods and systems of the present invention, the scope of the invention encompasses any language that is capable of embedding logic into an e-mail that is then communicated to an MTA using a protocol such as SMTP.

In some embodiments in accordance with the present invention, the electronic request is included in the body of an E-mail message. In such embodiments, the electronic request contains logic for how to construct encoded messages (e.g., encoded e-mail). Such encoded messages can then be distributed to one or more recipients using an MTA. The electronic request can be coded, for example, in an extensible markup language having specific list and token features designed for retrieving data and formatting the e-mails. In some embodiments, the template and the recipient list is included in the common body of the electronic request. Alternatively, in some embodiments, one or more EXML messages may also be included as attachments to an e-mail message, which will then be interpreted by the MTA.

In some embodiments, information necessary to construct the customized encoded messages that are distributed to recipients are found in one or more databases and/or one or more flat text files. In such instances, the electronic request includes instructions for how to access such databases and/or flat files and how to process the information contained in these data structures in order to create customized digital messages for distribution.

Another aspect of the present invention provides a novel MTA that is configured to receive and parse the electronic requests described above. As such, the novel MTA has the functionality of a conventional MTA. This conventional functionality includes the ability to process e-mails that are compliant with the SMTP, POP3, X.400, ESMTP or MHS protocol or a variant thereof (e.g., a program similar to or derived from SMTP, POP3, X.400, ESMTP or MHS). The ability to process such e-mails is a service offered by conventional MTAs. In addition to this conventional ability, the novel MTA of the present invention can recognize an electronic request in accordance with the present invention that is sent to the MTA. When the novel MTA identifies such an electronic request, the MTA serves as a personalization module that parses the electronic request in order to generate and send personalized e-mails based on instructions contained within the electronic request.

One aspect of the invention provides a method of distributing one or more encoded messages (e.g., customized e-mail) to a corresponding one or more recipients using the SMTP, POP3, X.400, ESMTP or MHS protocol or a variant thereof (e.g., a program similar to or derived from SMTP, POP3, X.400, ESMTP or MHS). In the method, an electronic request is received by an MTA. The electronic request includes instructions for accessing one or more (e.g., a plurality) e-mail destinations corresponding to the one or more recipients. The electronic request further includes instructions for accessing customization data relating to the recipients. The electronic request also includes instructions that define a message body (e.g., a message template) for use in the one or more encoded messages. In the method, customization data relating to recipients is obtained using the instructions for accessing customization data defined in the electronic request. For each respective recipient, a message body corresponding to the recipient is formatted using customization data relating to the respective recipient obtained by the method. In this way, one or more encoded messages are constructed. Finally, the one or more encoded messages is distributed to a corresponding one or more recipients.

Another aspect of the present invention provides a computer program product for use in conjunction with a computer system. The computer program product comprises a computer readable storage medium and a computer program mechanism embedded therein. The computer program mechanism comprises instructions for receiving an electronic request using the SMTP, POP3, X.400, ESMTP or MHS protocol or a logical variants thereof (e.g., a program similar to or derived from SMTP, POP3, X.400, ESMTP or MHS). The electronic request includes instructions for accessing one or more destinations corresponding to one or more recipients. The electronic request further includes instructions for accessing customization data relating to the recipients. The electronic request also includes instructions that define a message body for use in one or more encoded messages that are sent to the recipients. The computer program mechanism further comprises instructions for obtaining customization data relating to the recipients using the instructions for accessing customization data defined in the electronic request. The computer program mechanism further comprises instructions for formatting, for each respective recipient, a message body corresponding to the respective recipient using customization data relating to the respective recipient obtained by the instructions for obtaining. This allows for the construction of one or more encoded messages. The computer program mechanism also comprises instructions for distributing the one or more encoded messages to the recipients.

Still another aspect of the invention comprises a computer system for distributing one or more encoded messages to a corresponding one or more recipients. The computer system comprises a central processing unit and a memory that is coupled to the central processing unit. The memory stores a message personalization module and a transfer agent module. The message personalization module comprises instructions for receiving an electronic request using the SMTP, POP3, X.400, ESMTP or MHS protocol or a logical variant thereof (e.g., a program similar to or derived from SMTP, POP3, X.400, ESMTP or MHS). This electronic request includes instructions for accessing a plurality of destinations (e.g., e-mail destinations, FAX numbers, etc.) corresponding to the recipients. The electronic request further includes instructions for accessing customization data relating to recipients. The electronic request also includes instructions that define a message body for use in one or more encoded messages to correspondingly be sent to the one or more recipients. The message personalization module also comprises instructions for obtaining customization data relating to the recipients using the instructions for accessing customization data defined in the electronic request. The message personalization module also comprises instructions for formatting, for each respective recipient, a message body corresponding to the respective recipient using customization data relating to the respective recipient. The mail transfer agent module comprises instructions for distributing one or more encoded messages to the one or more recipients. In some embodiments, the message personalization module is a component of the mail transfer agent module. In some embodiments, the mail transfer agent module is a component of the message personalization module. In some embodiments, the mail transfer agent module and the message personalization module are separate computer programs. In some embodiments, the mail transfer agent module and the message personalization module are within the same computer program.

Still another aspect of the invention is a computer program product for use in conjunction with a computer system. The computer program product comprises a computer readable storage medium and a computer program mechanism embedded therein. The computer program mechanism comprises instructions for sending an electronic request using the SMTP, POP3, X.400, ESMTP or MHS protocol or a logical variant thereof (e.g., a program similar to or derived from SMTP, POP3, X.400, ESMTP or MHS). The electronic request includes instructions for accessing a one or more destinations corresponding to one or more recipients. The electronic request further includes instructions for accessing customization data relating to the one or more recipients. The electronic request further includes instructions that define a message body for use in one or more encoded messages sent to the one or more recipients.

Yet another aspect of the present invention provides a computer system comprising a central processing unit and a memory that is coupled to the central processing unit. The memory comprises instructions for sending an electronic request using the SMTP, POP3, X.400, ESMTP or MHS protocol or a logical variant thereof (e.g., a program similar to or derived from SMTP, POP3, X.400, ESMTP or MHS). The electronic request includes instructions for accessing one or more destinations corresponding to one or more recipients. The electronic request further includes instructions for accessing customization data relating to the recipients. The electronic request also includes instructions that define a message body for use in sending one or more encoded messages to the one or more recipients.

4. BRIEF DESCRIPTION OF THE DRAWINGS

Like reference numerals refer to corresponding parts throughout the several views of the drawings.

5. DETAILED DESCRIPTION

The present invention encompasses systems and methods for providing an electronic request (encoded e-mail) to a processing module, such as an of the present invention MTA, using the SMTP, POP3, X.400, ESMTP or MHS protocol or a logical variant thereof (e.g., a program similar to or derived from SMTP, POP3, X.400, ESMTP or MHS). Upon receipt of the electronic request, the processing module generates a customized e-mail using data from a data repository or any other data source. For a general reference regarding e-mail protocols, see Hughes, 1998, *Internet E-mail: Protocols, Standards, and Implementation*, Artech House Publishers, which is hereby incorporated herein by reference in its entirety.

Figure 3:
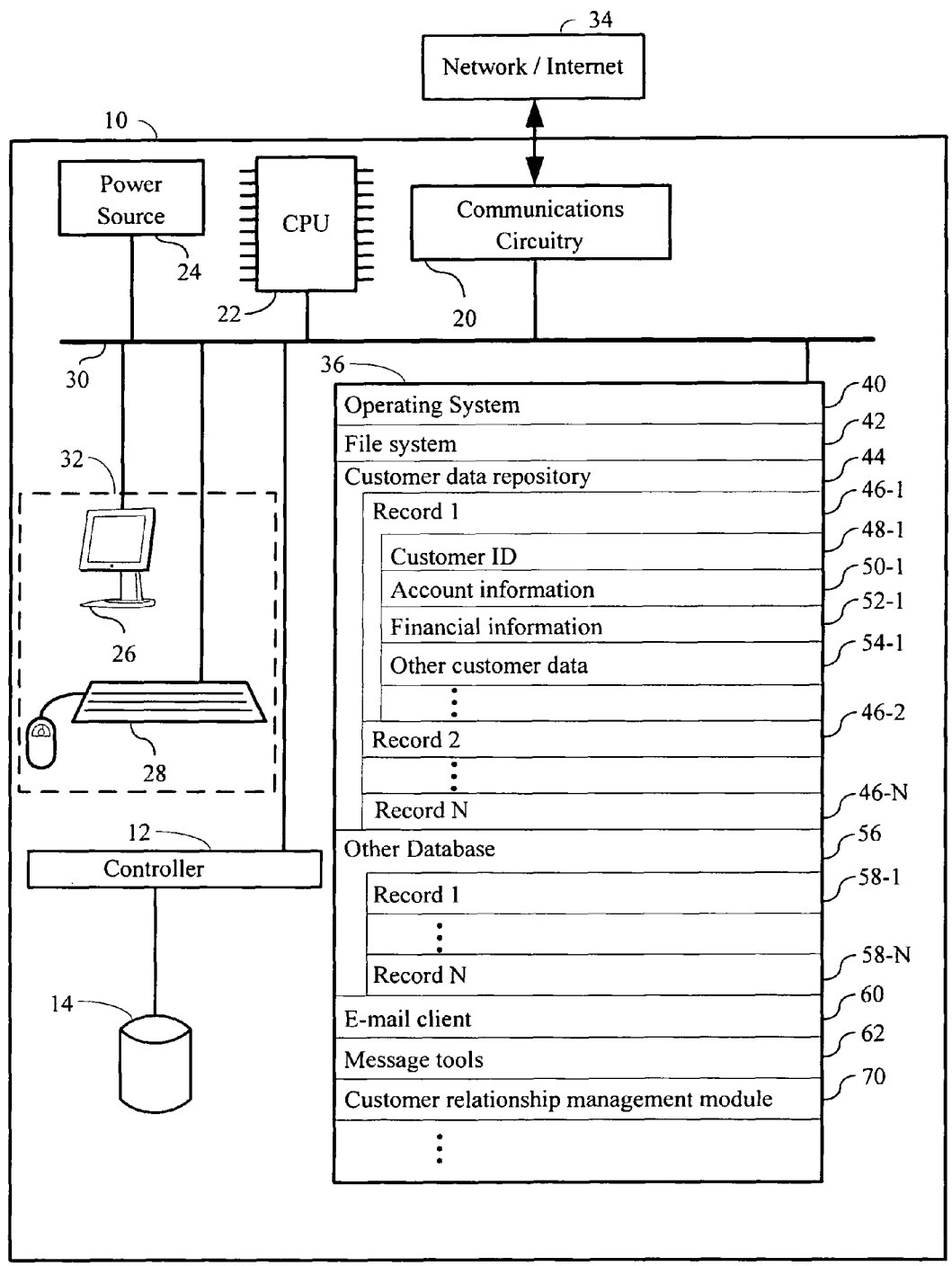
FIG. 3 is a schematic diagram of a client computer system for sending an electronic request message for generating encoded messages in accordance with an embodiment of the present invention.

FIG. 3 details an exemplary system that supports the functionality described above. The system is preferably a computer system 10 having:

a central processing unit 22;

a main non-volatile storage unit 14, for example, a hard disk drive, for storing software and data, the storage unit 14 controlled by controller 12;

a system memory 36, preferably high speed random-access memory (RAM), for storing system control programs, data, and application programs, comprising programs and data loaded from non-volatile storage unit 14; system memory 36 may also include read-only memory (ROM);

a user interface 32, comprising one or more input devices (e.g., keyboard 28) and a display 26 or other output device;

a network interface card 20 or other communication circuitry for connecting to any wired or wireless communication network 34 (e.g., the Internet or any other wide area network);

an internal bus 30 for interconnecting the aforementioned elements of the system; and a power source 24 to power the aforementioned elements.

Operation of computer 10 is controlled primarily by operating system 40, which is executed by central processing unit 22. Operating system 40 can be stored in system memory 36. In addition to operating system 40, in a typical implementation, system memory 36 can include one or more of the following:

file system 42 for controlling access to the various files and data structures used by the present invention;

a customer data repository 44 including a plurality of records 46, each record 46 corresponding to a particular customer, for example, data related to customer name 48, account information 50, financial records 52, and other customer data 54;

other data repositories, databases or data structures 56, including records 58 which may be resident in memory 36 or addressable by system 10 through a network connection, storage media interface, or the like;

an e-mail client 60 for sending an electronic request (e.g., an EXML message) to a personalization module on a remote computer (server) using a data network and/or Internet;

optional message tools 62 and/or templates to aid in generating an electronic request with instructions to the personalization module for retrieving customization data (e.g., customer data) and formatting encoded messages (e.g., e-mails) for distribution by a software program such as an MTA; and an optional customer relationship management module 70.

As illustrated in FIG. 3, computer 10 comprises software program modules and data structures. The data structures stored in computer 10 include, for example, customer data repository 44 and one or more other databases 56 (e.g., an enterprise resource planning database, a human resource database, a supply chain database, etc.). In some embodiments, customer data repository 44 is replaced with other forms of customization data such a site-specific maps, weather, specific forms on news, market data, conference room availability, etc. In some embodiments, such customization data is in addition to customer data repository 44. Each of these data structures can comprise any form of data storage including, but not limited to, a flat ASCII or binary file, an Excel spreadsheet, a relational database (SQL), or an on-line analytical processing (OLAP) database (MDX and/or variants thereof). In some embodiments, customer data repository 44, optional databases 56, and customer relationship management module 70 are not housed on client 10, but rather are housed on a server that includes the MTA the processes the electronic request generated by client 10 and/or are located on computers that are in electronic communication with such a server.

In some embodiments, each of the aforementioned data structures that are stored on or are accessible to system 10 is a single data structure. In other embodiments, such data structures, in fact, comprise a plurality of data structures (e.g., databases, files, archives) that may or may not all be hosted by computer 10. For example, in some embodiments, repository 44 comprises a plurality of structured and/or unstructured data records that are stored either on computer 10 and/or on computers that are addressable by computer 10 across network/Internet 34.

In some embodiments, data repository 44 and/or database 56 comprises a database that is either stored on computer 10 or is distributed across one or more computers that are addressable by computer 10 by network/Internet 34. Thus, in some embodiments, one or more of such data structures is hosted by one or more remote computers (not shown). Such remote computers can be located in a remote location or in the same room or the same building as computer 10. As such, any arrangement of the data structures and software modules illustrated in FIG. 1 on one or more computers is within the scope of the present invention so long as these data structures and software modules are addressable by computer 10 across network/Internet 34 or by other electronic means. Moreover, other systems, application modules and databases not shown in FIG. 1 can be stored in system memory 36. Thus, the present invention fully encompasses a broad array of computer systems.

In some embodiments, client computer 10 is used to store customer data 46, 56 or other forms of customization data and to send an electronic request to a personalization module on a remote computer. The electronic request comprises instructions for retrieving customer data from customer data repository 44 and/or database 56 and/or CRM 70 and/or other sources of customization data (e.g., maps, weather). The electronic request further comprises instructions for formatting encoded messages such as E-mail messages. The electronic request can comprise instructions for a single digital message for a single recipient. Alternatively the electronic request can comprise instructions for a plurality of encoded messages each intended for a different recipient. Such encoded messages can be distributed by e-mail, SMS, FAX, IM, voice, or any other digital communication process. However, in preferred embodiments, the encoded messages are e-mail messages. In some embodiments, client 60 is used to send this electronic request. In some embodiments, the electronic request is constructed using text editing functionality directly provided by client 60. In other embodiments, optional message tools 62 are provided to assist in the creation of the electronic request. Such message tools can include, for example, a graphical user interface (GUI) driven XML and/or HTML editor for designing the appearance of customized e-mails for distribution. In such embodiments, message tools reduce the image produced using the GUI to a set of commands for inclusion in the electronic request. Although SMTP is used to introduce and illustrate the concepts of the present invention, the scope of the invention is not limited to SMTP. For example, extended simple mail transfer protocol (ESMTP) has been developed to meet the increasing demands of attaching various types of files to e-mails. ESMTP specifies additional extensions to the original protocol for sending e-mail that supports graphics, audio and video files, and text in various national languages. Other examples of mail protocols that can be used to send an electronic request to an MTA include, but art not limited to, POP3, X.400, or MHS protocols or logical variants thereof (e.g., e-mail messages sent using programs similar to or derived from POP3, X.400, or MHS).

In some embodiments the electronic request is compliant with one of the aforementioned e-mail protocols and is encoded in the XML language. XML is described in, for example, Ray, *Learning XML*, second edition, O'Reilly Associates; Harold and Means, *XML in a Nutshell*, third edition, O'Reilly Associates; and Hunter et al., *Beginning XML*, third edition, Wrox, each of which is hereby incorporated herein by reference in its entirety.

Figure 2:
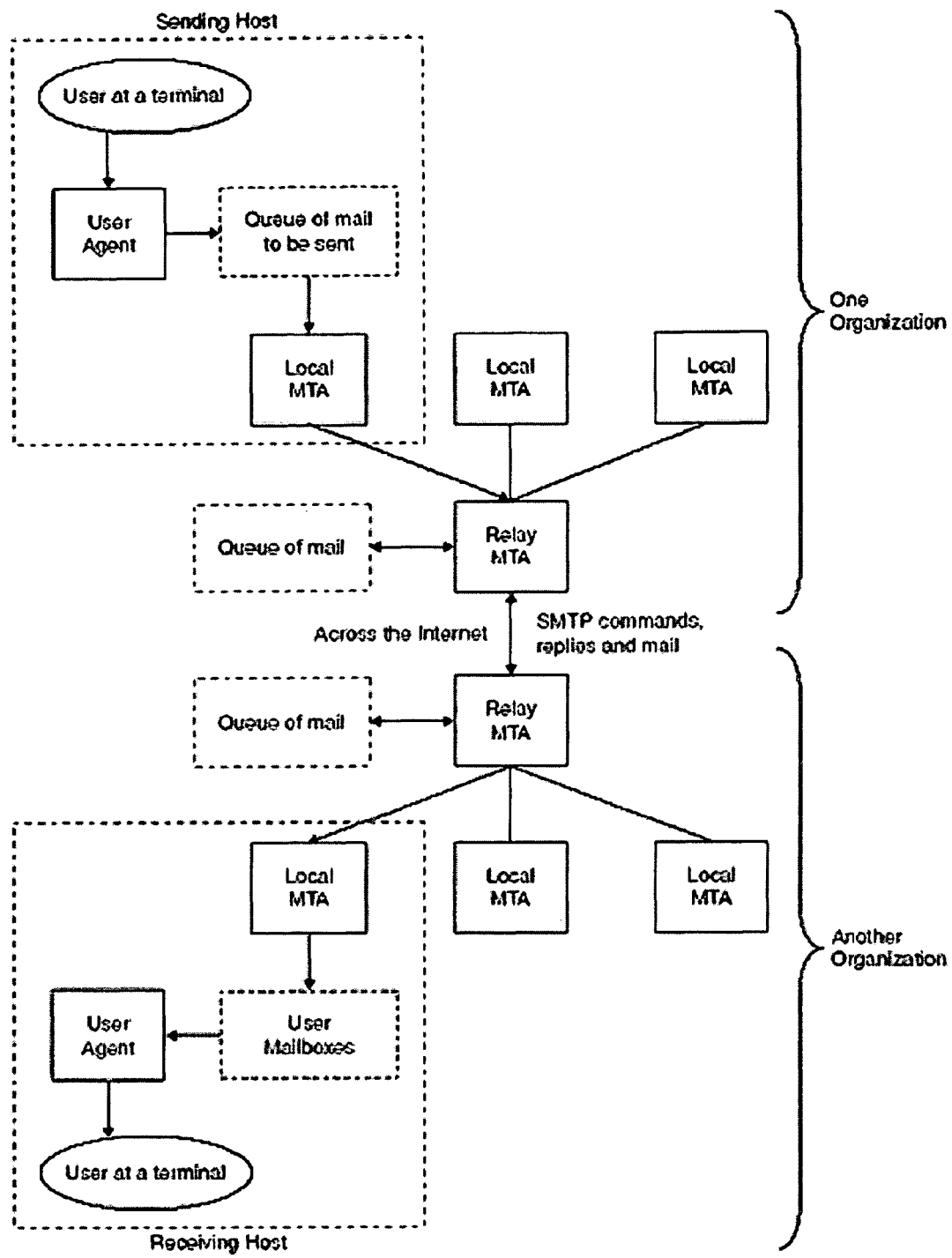
FIG. 2 is the simple mail transfer protocol (SMTP) model with relay mail transfer agents in accordance with the prior art.

Now that an overview of a client system in accordance with one embodiment of the present invention has been described, various advantageous methods that can be used in accordance with the present invention will now be disclosed in conjunction with FIGS. 2 and 3.

Figure 4:
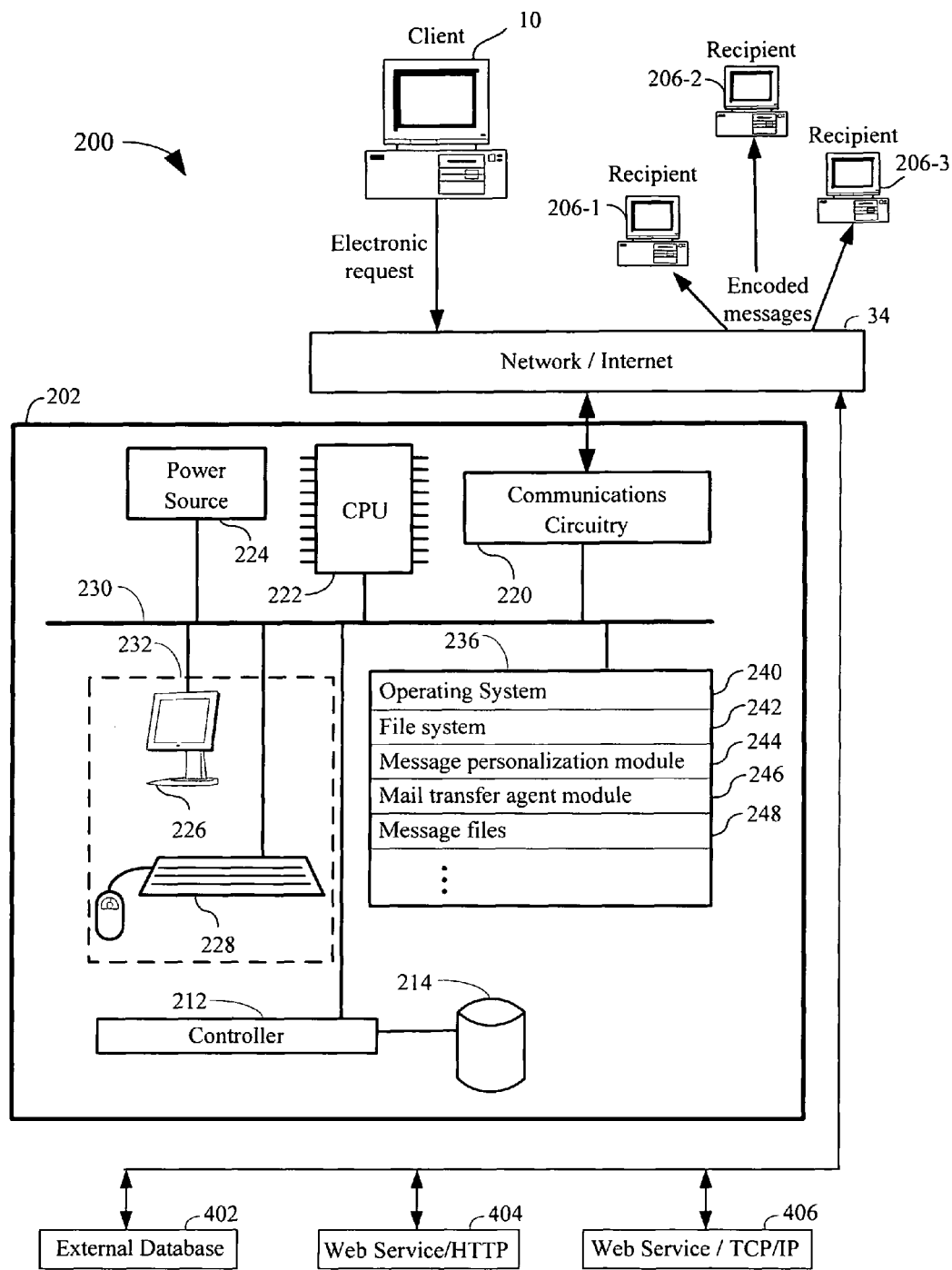
FIG. 4 is a schematic diagram of a system according to the present invention for generating and sending encoded messages from a user in accordance with an embodiment of the present invention.

Referring to FIG. 4, in an embodiment in accordance with the present invention, user computer 10 is used to generate an electronic request, in the form of an e-mail message, that includes encoded instructions. User computer further sends the electronic request to digital personalization server 202. In the embodiment illustrated in FIG. 4, server 202 includes MTA functionalities in addition to the functionalities of the present invention. In other embodiments, server 202 includes functionality for distributing other forms of digital communication such as SMS, FAX, IM, or voice mail. The server 202 illustrated in FIG. 4 comprises:

a CPU 222;

a main non-volatile storage unit 214 controlled by controller 212;

a system memory 236, preferably high speed random-access memory (RAM), for storing system control programs such as operating system 240 and file system 242, data and application programs loaded from non-volatile storage unit 214; system memory 236 may also include read-only memory (ROM);

a user interface 232, comprising one or more input devices (e.g., keyboard 228) and a display 226 or other output device;

a network interface card 220 or other communication circuitry for connecting to any wired or wireless communication network and/or Internet 34;

an internal bus 230 for interconnecting the aforementioned elements of the system; and a power source 224 to power the aforementioned elements.

EXML messages of the present invention can be sent, for example, by e-mail from client 10 to digital message personalization module server 202 when a user desires to have server 202 generate and send one or more encoded messages, such as personalized or customized e-mails, to one or more intended recipients 206, e.g., clients, customers, potential customers, and/or any other desired recipients for whom the user has access to personalized data in a data repository 204. The electronic request provides instructions for generating and sending the encoded messages, and includes information for formatting the encoded messages as well as instructions for retrieving the personalized data from data repository 204.

In some embodiments in accordance with the present invention, server 202 is external with respect to client 10 (e.g., FIG. 2). In some embodiments in accordance with the present invention, the encoded messages are sent from server 202. Alternatively, in other embodiments in accordance with the present invention, server 202 is an integral part of recipient 206. In still other embodiments in accordance with the present invention, client 10 is an integral part of server 202.

Figure 5:
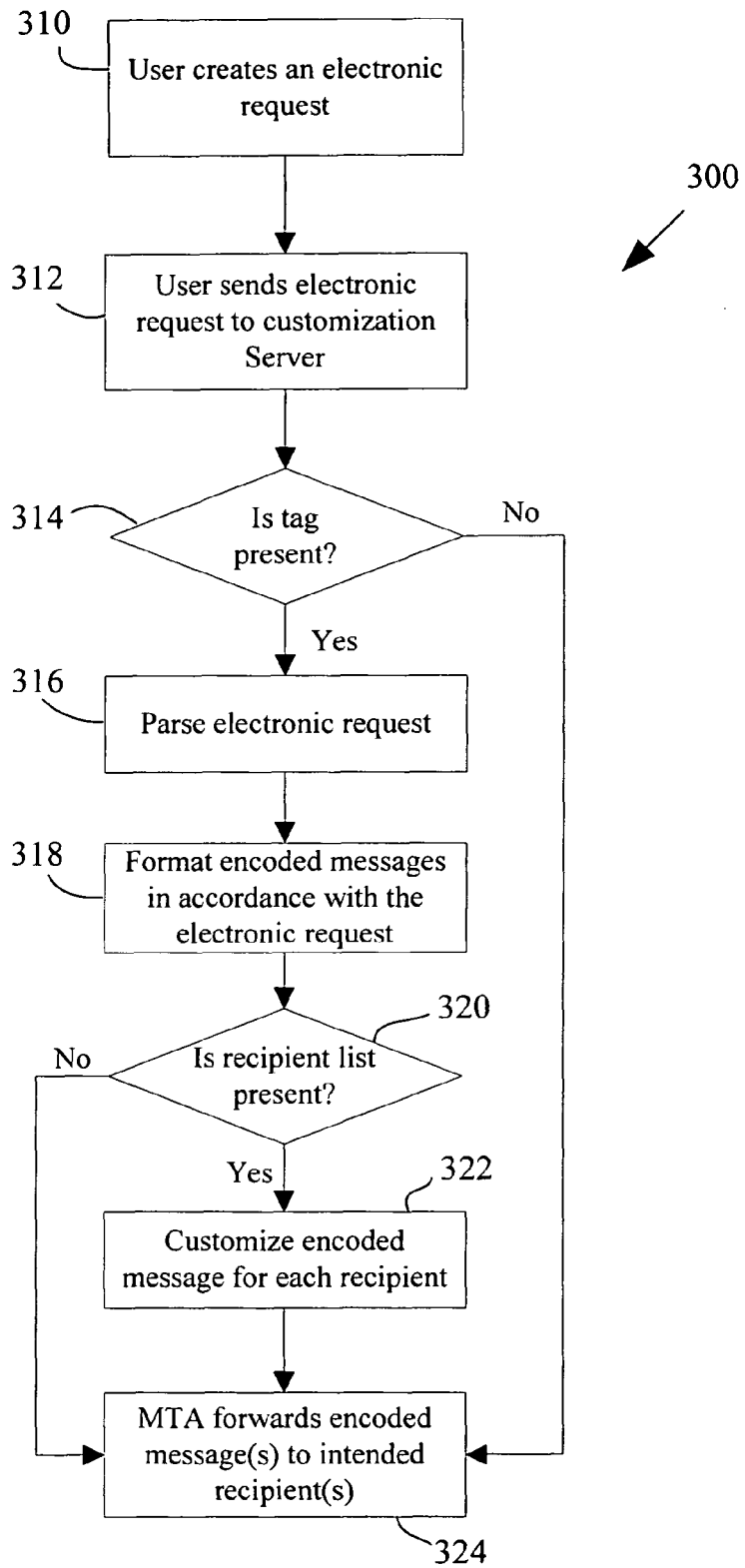
FIG. 5 is a flowchart depicting a method of sending encoded messages to one or more intended recipients using encoded instructions from a user in accordance with an embodiment of the present invention.

FIG. 5 provides a general overview of a method 300 for sending customized encoded messages to intended recipients in accordance with an electronic request from a user. In step 310, a user creates an electronic request at client 10. This electronic request can include text, markup language (e.g., HTML, WML, BHTML, RDF/XML, RSS, MathML, XHTML, SVG, cXML or XML), or other scripts or objects. In some embodiments, the electronic request is created directly using e-mail client 60 (FIG. 3). In some embodiments, the electronic request is created using optional Message tools 62 (FIG. 3). From here, the present invention provides different possibilities (use cases).

In one possible use case, the user sends the electronic request directly to personalization server 202 as noted in step 312 of FIG. 5 using client 60 (FIG. 3). To illustrate this use case, consider a situation in which marketing manager John creates a single electronic request in the form of an e-mail using computer 10 of FIG. 3 that contains a list of recipient users, personalization tokens and predefined tokens, and also contains a message body that uses these tokens. John sends the electronic request using standard Outlook/Exchange (an example of client 60) to exml@XYZ.com, the address of message personalization module 244. The module 244 interprets the instructions and data in the electronic request and sends fully personalized encoded messages, in the form of e-mail, to all the final recipients.

In another possible use case, the user sends an electronic request to CRM 70 before the electronic request is sent to personalization server 202 in accordance with step 312 of FIG. 5. To illustrate this use case, consider the situation in which marketing manager Debbie decides to make used of CRM system 70 of FIG. 3. The CRM system already does some limited personalization. Debbie creates a new electronic request template that contains more extensive personalization than the use case presented above (e.g., by using XML/XSLT). The electronic request that Debbie wishes to make can be created in at least two different ways. In one approach, the electronic request is created by message tools 62 (e.g., Outlook/Exchange) and sent to CRM 70 where static CRM tokens in the electronic request are populated. Then, the electronic request is sent from CRM 70 of computer 10 to personalization module 244 of computer 202. In another approach, the electronic request is created directly in CRM module 70. Regardless of how the electronic request is originated, rather than sending the messages encoded by Debbie's electronic request directly from CRM 70 to one or more recipients, the encoded message is sent with to a specific address, e.g., exml@XYZ.com, in this example, message personalization module 244.

Figure 1:
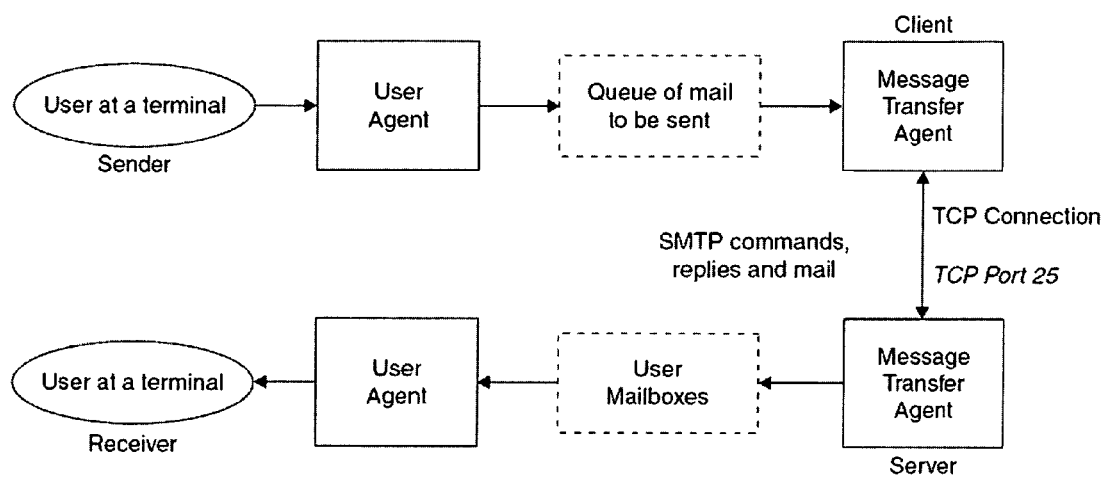
FIG. 1 is the basic simple mail transfer protocol (SMTP) model in accordance with the prior art.

In yet another possible use case, the user sends the electronic request directly to e-mail personalization server 202 as noted in step 312 of FIG. 5 using e-mail client 60 (FIG. 1). The electronic request contains multiple levels of information. To illustrate this use case, consider a situation in which sales manager Mark creates an EXML template using computer 10 of FIG. 1. This is one form of electronic request. The EXML template contains a list of Mark's customers, personalization tokens and predefined tokens, and also contains a message body that uses these tokens. The predefined tokens correspond to functions comprising meeting scheduling, sending out pre-formatted correspondence (e.g., sales follow-up materials). Mark sends the electronic request using standard Outlook/Exchange (an example of E-mail client 60) to exml@XYZ.com, the address of message personalization module 244. The module 244 interprets the EXML instructions and data and sends fully personalized encoded messages (e.g., encoded e-mails) to one or more final recipients.

Referring to step 314, regardless of which use case is employed in preceding steps, server 202 reads the electronic request sent by client 10 in order to determine whether the electronic request encodes for the encoded messages of the present invention. Specifically, in one embodiment, message personalization module 244 reads the message in step 314. If a specialized tag (e.g., an <EXML> tag) is not present in the message (step 314-No), message personalization module 244 cedes control to mail transfer agent module 246. Mail transfer agent module 246, in turn, processes the message in a conventional fashion by forwarding the message to the one or more intended recipients. In some embodiments in accordance with the present invention, the mail transfer agent (MTA) module 246 is a message server having MTA and/or electronic-MTA capabilities.

Returning to the embodiment illustrated in FIG. 4, when message personalization module 244 determines that a specialized tag (e.g., an <EXML> tag) is present in the message (step 314-Yes), this indicates that the message is an electronic request. In such instances, the electronic request (e.g., EXML message) is parsed (step 316) by message personalization module 244 and one or more customized digital messages (e.g., one or more e-mail messages) are custom generated in accordance with the instructions contained within the electronic request (step 318). The delineation of a separate message personalization module 244 and mail transfer agent 246 as two separate modules is for illustrative purposes only. In some embodiments, message personalization module 244 and mail transfer agent module 246 are contained in the same software program. As such, the description of message personalization module 244 and mail transfer agent module as separate modules is merely provided herein to best illustrate the functionality of the MTAs of the present invention.

Referring to step 320, if the electronic request does not include a <FINAL_RECIPIENT> tag or some equivalent information for personalizing the message for a number of recipients (320-No), then mail transfer agent module 246 forwards the encoded request to the one or more intended recipients 324. If, however, a <FINAL_RECIPIENT> tag is present in the electronic request (320-Yes), then personalized encoded messages are generated for each specified recipient in 322. In some embodiments, there is only a single recipient. In some embodiments, the recipient is one or more computers (e.g., a blog site). In some embodiments, the <FINAL_RECIPIENT> instruction includes a pointer to database customer data repository 44 and/or other database 56. Repository 44 and/or database 56 is stored in client computer 10 and/or a computer that is addressable by client computer 202. In other words, in some embodiments the FINAL_RECIPIENT tag is in fact a dynamic token that accesses data at an external address. In step 324, the encoded messages are forwarded to the intended recipients by mail transfer agent module 246.

One advantage of the encoding methods of the present invention is that there is no absolute requirement for a specialized user interface in order to create an electronic request. For example, one can simply use an application such as Microsoft Outlook, and add lists from a spreadsheet, if desired. In fact, the electronic request can be constructed in a simple ASCII editor. In some embodiments, if a user has data in a customer relationship management database (e.g., Siebel or Oracle), enhanced functionality such as tracking, dynamic content, and the like can be utilized and/or incorporated to generate and send encoded messages such as personalized e-mail messages.

In some embodiments, the systems and methods of the present invention provide a user with the ability to encode instructions in the electronic request that instruct message personalization module 244 to access data from, or provide data to, data repositories stored in external systems (e.g., customer data repository 44 and/or other database 56 or flat file stored by or addressable by computer 202). Such data repositories can include, for example, one or more hierarchical databases, and/or one or more relational databases, and/or one or more other data structures or flat files. As illustrated in FIG. 4, data can be retrieved or submitted, for example, over network connection 34 or from storage media provided to the message personalization module 244. In FIG. 4, message personalization module 244 can communicate with one or more external databases 402, HTTP web services 404, or TCP/IP web services 406 using network connection 34. Using the systems and methods of the present invention, such resources can be accessed in order to provide secure custom statements (e.g., banking statements), person-to-person customized e-mail, traceable e-mails, e-mails from customer service to existing customers, e-mails from an employer to an employee, etc.

In some embodiments, for example for data security reasons, access to an entire customer database may be denied. In such embodiments, one or more files containing only the data required to generate the desired messages is made available to message personalization module 244 and/or mail transfer agent module 246.

In some embodiments, the electronic request includes limited or full access rights to a users' data repository. For example, an electronic request can include a command that defines limited or full login rights, limited or full query rights, access to only certain records, fields or files or certain portions of a database or data repository, access for a limited period of time, and the like.

In some embodiments, certain destinations associated with message personalization module 244 and/or mail transfer agent module 246 can be designed to be <EXML> enabled. For example, a particular mailbox called exml@ strongmailsystems.com (or exml@mtacompany.com) can be set up so that, when a user sends an electronic request to such an address, the request is parsed by message personalization module 244 and encoded messages are distributed by mail transfer agent module 246 based on the product of message personalization module 244 after parsing the EXML message.

In some embodiments, a customer relationship management system has the ability to personalize encoded messages (e.g. encoded e-mails) based on database tokens. In such embodiments, user computer 10 can originate an electronic request template that contains EXML formatting and data pointer information. In one example, for each digital message (e.g., e-mail) specified by the electronic request, the First_Name and Account_ID of each customer in a customer list can be represented, for example, as EXML tokens in the body of the electronic request. The electronic request containing these tokens is then sent to server 202, which then uses advanced parsing techniques to: (i) personalize the message (e.g., process as "Dear ##First_Name##, . . . "); (ii) add click tags and open tags; and (iii) apply XML/XSL rules that can further customize the digital message. In such instances, the output can be encoded e-mail messages, or other forms of encoded messages, personalized by the items above. Such encoded messages are then sent to each recipient specified by the original electronic request.

In another embodiment, client 10 creates a single electronic request (e.g., e-mail) using EXML encoding with the full list of recipients 206 and the tokens/instructions for formatting. The receiving system 202 receives this electronic request, interprets the EXML, and then generates one or more outgoing encoded messages (e.g., e-mail, FAXes, IM, voice, etc.) based upon the list and the personalization instructions in the electronic request.

A more detailed example of an electronic request for encoding messages that can be distributed by an MTA system in accordance with an embodiment of the present invention is reproduced below as lines 100 through 191 of XML code.

```
100  <EXML>
101  <TYPE="test">
102  <!-- Type="test" will validate the message only
103  and send back any errors to the sender, it
104  will not send the production mailing.
105  Note that the errors will be sent back to the sender
106  within another RETURN TO email with the errors and the
107  actual line(s) that caused the error(s).-->
108  <! -- Static Tokens -->
109  <STATIC_TOKENS>
```

```
110  <!--Static Tokens: Literals -->
111  ZIP_CODE = 94555
112  MAILINGID = 1234
113  <!--Static Tokens: CRM tokens -->
114  CRM_EMAIL =           [% email %]
115  CRM_FIRST_NAME =      [% fname %]
116  CRM_LAST_NAME =       [% lname %]
117  CRM_ACCOUNT_ID =      [% cid %]
118  <!-- Static Tokens: Predefined by eMTA -->
119  <!-- Available Predefined Tokens - already -->
120  <!-- defined in eMTA
121  VIRTUAL_SERVER: Virtual routing: virtual
     that have different characteristics servers 122
123              classes of digital messages for different
124  ##CANSPAM##: CAN SPAM: legal compliance with the 125
     CAN-SPAM law
126  ##HABEAS_HEADERS##: Headers - special headers for
127  reputation e.g. Habeas headers
128  ##TRACK## or ##OPENTAG##: Tracking (opens clicks 129
     unsubs) : tracking of opens/clicks/unsubs with
130              personalized links
130  XML/XSL rules: personalization rules coded in
131  standard XSL
132  Reporting: reporting based on mailing-id,
133  message-id, etc. -->
134  </STATIC_TOKENS>
135  <!-- Static Tokens -->
136  <DYNAMIC_TOKENS>
137  BANK_BRANCHES=
138  <SQL DBHOST="db-host1"DBUSER="smail"
139          DBPASSWD="1234">
140          SELECT branch_names
141          FROM branch_table
142          WHERE ZIP=##ZIP_CODE##
143  </SQL>
144  WEATHER=
145  <HTTPGET>http://webservices.
146          weather.com/weather?zip=##ZIP_CODE##
147  </HTTPGET>
148  </DYNAMIC_TOKENS>
149  K!-- Final Recipients and Attributes ----------------150
     Note that the format is a specific format with 151
     the first row being the column names and the
152  column separator being "::". These parameters
153  can also be specified in the Mailing-->
154  <FINAL_RECIPIENTS> // this can be defined in XML also
155  email_address::favorite_color::zip_code
156  frank@strongmailsystems.com::blue::94131
157  shirish@strongmailsystems.com::red::90065
158  time@strongmailsystems.com::purple::60611
159  </FINAL_RECIPIENTS>
160  <HEADERS>
161  <!-- These headers would override the
162  headers from the original e-mail if they
163  exist. If they do not exist, then the
164  originating e-mail headers will be
165  forwarded -->
166  From: StrongMail Customer Support
167  </HEADERS>
168  <BODY>
169  Date: September 12, 2005
170  Dear ##CRM_FIRST_NAME##:
171  Your account ID is ##CRM_ACCOUNT_ID##
172  Your favorite color is ##favorite_color##
173  ##TRACK##http://www.strongmailsystems.com
174  ##OPENTAG##
175  <!-- Further personalization rules that the EXML
176  server can execute -->
177  <IF favorite_color == blue>
178  <IMG SRC="blue.gif">
179  </ELSE>
180  <IMG SRC="transparent.gif">
181  </IF>
182  Here is a list of the branches near you:
183  ##BANK_BRANCHES##
184  Here is your local weather:
185  ##WEATHER##
186  ##CANSPAN##
187  <!-- global token that exists on MTA -->
188  <!-- These are the CAN-SPAM legal compliance
```

```
189 footers in the email provided by tokens -->
190 </BODY>
191 </EXML>
```

The exemplary electronic request above includes specific XML tags and other statements that are used to construct an MTA production mailing. One tag is the EXML tag (line 100) that is used to indicate that the electronic request is in fact an electronic request of the form of the present invention as opposed to some other type of message. The content of the electronic request is contained within EXML start and closing tags. In the example above, the EXML tag is on line 100 and the closing tag is on line 191. Within the EXML opening and closing tags are found a variety of other tags and data elements. One data element is an optional type flag (line 101) that serves as a debugger code. When the optional debugger code is activated, no message is sent by mail transfer agent module 246.

Another tag is a STATIC_TOKENS tag. The STATIC_TOKENS opening (line 108) and closing (line 134) demark a portion of the EXML message that defines static tokens. Static tokens are elements of information that, once defined, do not change. Three possible types of static tokens are literal, CRM, and predefined eMTA tokens.

Another type of tag that can be found in the exemplary electronic request is the DYNAMIC_TOKENS tag. The DYNAMIC_TOKENS opening (line 136) and closing tag (line 148) demark tokens that are filled by callbacks to an external database such as, for example, customer data repository 44 or other type of database 56 on computer 10 of FIG. 3. In fact, dynamic tokens can be filled by callbacks to specific web site addresses and/or web services. Dynamic tokens are executed by eMTA 246 at runtime in order to retrieve requested information.

Yet another type of tag that can be found in the exemplary electronic request is the FINAL_RECIPIENTS or FINAL_RECIPIENT tag. The FINAL_RECIPIENTS opening (line 154) and closing tag (line 159) specifies the recipients of the final digital message (e.g., e-mail message) that is encoded in the electronic request. There can be a single recipient or a plurality of recipients.

A portion of the electronic request, denoted by HEADER tabs, specifies the format of the header of the encoded message that is sent to one or more recipients 206 by mail transfer agent module 246. Still another type tag that can be found in the exemplary electronic request is a BODY tag. In the exemplary electronic request above, the BODY opening tag (line 168) and closing tag (line 190) demark a portion of the electronic request that specifies the format of the body of the encoded message that is sent to one or more recipients 206 by mail transfer agent module 246.

The present invention places no restrictions on the order that each of the aforementioned tags appear within the electronic request. However, generally speaking, the EXML tag is the first tag and all other tags are nested within the EXML start and end tags in embodiments that make use of such tags. In other embodiments, other forms of tags and/or logic is used. There is no requirement that data belonging to each of the aforementioned tags appear in the EXML message. For example, in some embodiments, all or a portion of the data belonging to one of the aforementioned tags is located in one or more files or databases that are external to the electronic request. Such external files or databases can, for example, be at one or more locations that are addressable by message personalization module 244 via network/Internet 34. For instance, in some embodiments, the electronic request can refer message personalization module 244 to a specific URL address in order to obtain all or a portion of the data belonging to any of the aforementioned information elements.

Now that an overview of the architecture of exemplary electronic requests has been given, more details of each of the tags in an EXML message, which is one form of electronic request, will be provided with reference to specific lines of code in the example above.

Line 100. The EXML message is typically contained within the EXML beginning (<EXML>) and ending (</EXML>) tags. The presence of such tags in an e-mail originating from client 10 and that is parsed by module 244 notifies the module that the electronic request is an electronic request of the present invention as opposed to a conventional set of MTA instructions or other form of conventional communication such as a voice mail. In the example provided above, the tag that triggers message personalization module 244 is "<EXML>." However, the present invention is not limited to such a tag name. In other embodiments of the present invention, other tag names can be used to trigger personalization module 244 to recognize electronic requests of the present invention. All that is required is that the tag present in the electronic request be the one that module 244 is programmed to recognize. Furthermore, module 244 can be programmed to recognize multiple different tags, where each of the different tags signifies an associated set of rules. For example <TAG1> can signify an electronic request having one type of command structure and statements (information elements) whereas <TAG2> can signify an electronic request having a different command structure and statements (information elements). It will be appreciated that the invention is by no means limited to the tags set forth in this example. Users are free to create their own specialized DTD's (Document Type Definition) for EXML so that they can specify tags for custom logic.

Lines 101-107. In some embodiments of the present invention, the electronic request optionally has the feature of providing a test mode. In such a test mode, the electronic request is parsed by module 244 but no encoded messages are actually sent out by mail transfer agent module 246. Any errors that are found in the test run are reported back to client 10 so that the electronic request can be debugged. In some embodiments, such errors will be sent back to the sender within another RETURN TO e-mail with the errors and an indication of the actual line numbers within the electronic request that caused the errors. The test mode is advantageous because it allows for the MTA production mailing to be fully debugged before e-mail or other forms of digital messages are sent to intended recipients 206. In this way, intended recipients are not bothered with e-mail or other forms of digital messages that have incorrect information. One form of bug that can arise is incorrect access privileges to customer data repository 44 or other databases 56. For example, if the electronic request does not have the correct password encoded in the message, access to personalized information about each of the intended recipients will not be obtained and the encoded e-mails or other forms of encoded messages to one or more intended recipients will not be customized. In some embodiments, encoded messages are not customized at all for specific recipients. Rather, such messages include logically encoded data (e.g. weather, maps) and/or are intended for special purpose computers (e.g., blog sites).

Lines 108-135. Lines 108 through 135 of the exemplary electronic request enumerate specific types of static tokens. Three different types of static tokens are defined within the STATIC_TOKENS tag literal (lines 110-112), CRM tokens (lines 113-117), and predefined eMTA tokens (118-133). Literal tokens are for use only in a given electronic request. For instance, line 111 of the exemplary electronic request provides a static token that defines the literal "zip code" having the value "94555." Further, line 112 of the electronic request provides a static token that defines the literal "mailingid" having the value "1234."

Lines 113 through 117 of the electronic request demark static tokens that are CRM tokens. CRM tokens can be used in embodiments where the electronic request is routed through a CRM, such as CRM 70 of FIG. 1 prior to routing the electronic request to module 244. When the electronic request passes through CRM module 70, the CRM tokens are populated with appropriate information. In the case of the exemplary EXML message above, the static CRM tokens "CRM_EMAIL," "CRM_FIRST_NAME," "CRM_LAST_NAME," as well as "CRM_ACCOUNT_ID" are used to denote select personalized information about recipients 206. These tokens are populated with information by a customer management relationship software product such as Siebel 7.8 (Siebel Systems Inc., San Mateo, Calif.).

Lines 118 through 133 describe static tokens that are already defined by mail transfer agent module 246. One such type of token is the VIRTUAL_SERVER token that specifies a virtual route. Each such virtual route can have different characteristics to handle different classes of digital messages. The "##CANSPAM##" is placed in an electronic request when the encoded messages of the electronic request must comply with the CAN-SPAM law. The CAN-SPAM Act of 2003, Controlling the Assault of Non-Solicited Pornography and Marketing Act, establishes requirements for those who send commercial email, spells out penalties for spammers and companies whose products are advertised in spam if they violate the law, and gives consumers the right to ask e-mailers to stop spamming them. The law, which became effective Jan. 1, 2004, covers e-mail whose primary purpose is advertising or promoting a commercial product or service, including content on a Web site. If this is the primary purpose of the digital messages encoded by a given electronic request, than the ##CANSPAM## static token is added to an electronic request. The eMTA then ensures that the encoded messages of the electronic request comply with the CAN-SPAM act. For instance, the CAN-SPAM Act bans false or misleading header information. Furthermore, the e-mail's "From," "To," and routing information, including the originating domain name and e-mail address, must be accurate and identify the person who initiated the e-mail. Furthermore, the CAN-SPAM Act prohibits deceptive subject lines. The CAN-SPAM Act further requires that email give recipients an opt-out method, e.g., provide a return email address or another Internet-based response mechanism that allows a recipient to ask that future email messages to that email address cease. As such, the ##CANSPAM## static token is used to invoke CAN-SPAM act compliance.

Another type of static token that can be interpreted by mail transfer agent module 246 are ##HABEAS_HEADERS## tokens. Habeas Inc. (Mountain View, Calif.) provides a license to add hidden information to your e-mail messages that certifies to certain recipients that the email address to which it is being sent was acquired using a fully confirmed legal opt-in method (e.g., double opt-in). Placement of the static token ##HABEAS_HEADERS## in an EXML message instructs module 246 to use a Habeas header.

Still another type of static token that can be interpreted by module 246 are static tokens such as ##TRACK## or ##OPENTAG##. When module 246 identifies such tokens, it inserts logic into the outgoing e-mails sent to recipients 206 designed to track user events such as when such e-mail is opened, or when portions of such e-mail (e.g. embedded URLs in the e-mail) are clicked by a user. Other events that can be tracked by such logic include subscribe and unsubscribe events. For example, one form of static token that can be interpreted by module 246 causes module 246 to add an unsubscribe option to outgoing e-mail. When a recipient selects the unsubscribe option, this information is communicated back to system 10 and the recipient is removed from a mailing list.

Still another type of static token are XML/XSL rules that can be encoded in standard extensible stylesheet language (XSL). XSL is a family of recommendations for defining XML document transformation and presentation. XSL includes (i) XSL transformations (XSLT) which is a language for transforming XML, (ii) the XML Path Language (XPath) which is an expression language used by XSLT to access or refer to parts of an XML document (XPath is also used by the XML Linking specification), and (iii) XSL formatting objects (XSL-FO) which is an XML vocabulary for specifying formatting semantics. An XSLT stylesheet specifies the presentation of a class of XML documents by describing how an instance of the class is transformed into an XML document that uses a formatting vocabulary, such as (X)HTML or XSL-FO. Such XSL tokens can be used to provide personalization rules, for example, for reporting based on mailing-id, etc.

Lines 135-148. Lines 135 through 148 of the exemplary electronic request demark the start and end of the DYNAMIC_TOKENS tag. Nested within the boundaries of the DYNAMIC_TOKENS tag are definitions of specific types of information and/or instructions for obtaining such information. This information is used to form customized encoded messages. For instance, lines 137-143 of the electronic request define an SQL query instruction. The SQL query instruction is designed to connect to the database host "dbhost1", to login to the database as user "smail" with a password of "1234" and to select all branch_names records from the table branch_table having a zip code that matches ##ZIP_CODE##. Recall that ##ZIP_CODE## is a static token that is defined on line 111 of the EXML message. The value for ##ZIP_CODE##, 94555 is passed to the SQL query by message personalization module 244 and/or mail transfer agent model 246 when the SQL query is executed.

Another example of a DYNAMIC_TOKEN is found on lines 144-147 of the electronic request, which defines an HTTP request. The HTTP request is designed to obtain the weather at the geographical region defined by ##ZIP_CODE## from the URL webservices.weather.com.

Lines 149-159. Lines 149 through 159 of the exemplary electronic request demark the start and end of a FINAL_RECIPIENTS tag. Nested within the boundaries of the FINAL_RECIPIENTS tag are the e-mail addresses of recipients 206. Specifically, line 155 defines the data structure of the e-mail addresses that follow. Line 155 states that each line of data to follow, up to the end of the FINAL_RECIPIENTS tag on line 159, has three data elements (i) e-mail address, (ii) the favorite color of the addressee associated with the e-mail address, and (iii) the zip code of the addressee associated with the e-mail address. Line 155 further states that the delimiter between each of these data elements is a double colon "::". Thus, line 156 of the exemplary electronic request is parsed to read the e-mail address "frank@strongmailsystems.com," the favorite color blue, and the zip code 94131. This zip code is used in the SQL and HTTP requests defined in the statements nested in the DYNAMIC_TOKENS tag described above.

There is no requirement that the electronic request have more than one final recipient. In fact, in some instances there is only one final recipient. For example, in the exemplary electronic request above, rather than having the FINAL_RECIPIENT block defined by lines 154 through 159, the following block is provided:

```
200       <!-- Example 2 -->
201       <!--Another example with only 1 Final Recipient -->
202       <FINAL_RECIPIENT> // this can be defined in XML as well
203            email_address::first_name::accountid
204
          ##CRM_EMAIL##::##CRM_FIRST_NAME##::##CRM_ACCOUNT_ID##
205       </FINAL_RECIPIENT>
```

In this example, line 202 is the opening tag line for a FINAL_RECIPIENT and line 205 is the closing tag line. At line 203, the structure of the data on line 204 is defined. Specifically, line 203 defines the data structure of the e-mail address that follows. Line 203 states that line 204 has three data elements (i) e-mail address of the addressee, (ii) the first name of the addressee associated with the e-mail address, and (iii) the customer relationship account identifier of the addresses. Line 203 further states that the delimiter between each of these data elements is a double colon "::". Thus, line 204 of the exemplary EXML message is parsed to read the e-mail address form three static tokens: a CRM static token entitled "CRM_EMAIL," a CRM static token entitled "CRM_FIRST_NAME," and a CRM static token entitled "CRM_ACCOUNT_ID." Thus, when code lines 200 through 205 are used in the EXML message, the EXML message is passed through CRM 70 in order to fetch the values for the three CRM tokens.

There is no limit on the types of tokens that can be used in the recipient list. The following example replaces the FINAL_RECIPIENT block defined by lines 154 through 159 with the following recipient block in which recipients are defined with a mix of CRM static tokens and dynamic tokens:

addressee associated with the e-mail address, (iii) the zip code of the addressee associated with the e-mail address, and (iv) the dynamic token BANK_BRANCHES which uses the zip code of the addressee associated with the e-mail address to dynamically find the bank branches in the vicinity of the user associated with the e-mail address in accordance with the BANK_BRANCHES dynamic token defined by lines 137-143. As in the other examples, line 306 further states that the delimiter between each of these data elements is a double colon "::".

Lines 160-190. Lines 160 through 190 describe the format of the encode message (e.g., encoded e-mail) that is sent to one or more recipients 206. The optional HEADER tag at line 160 denotes an optional header that overrides the header of the original exemplary electronic request. Any header nested within the HEADER start (line 160) and end (line 167) tag is used in the encoded message that is sent by module 246 to one or more recipients 206. If the HEADER tag is not present in the electronic request, then the header of the electronic request is used by module 246 as the header of the encoded messages to one or more recipients 206. In the exemplary electronic request above, the HEADER statement overrides the default header so that all encoded messages sent by MTA module 246 in response to the electronic request will appear to have originated from "StrongMail Customer Support."

Lines 168 and 190 of the exemplary electronic request demark the start and end of the BODY tag. Nested within the boundaries of the BODY tag is a description of the body that is sent by module 246 to recipients 206 in accordance with the electronic request.

In accordance with line 169 of the exemplary electronic request, the first line of such an encode message will say "Date: Sep. 12, 2005." In accordance with line 170 of the exemplary electronic request, the next line of the encoded message will say "Dear % fname %" where "% fname %" is

```
300             <!-- Example 3 -->
301             <!-- RECPIENTS with mix of CRM tokens, Dynamic tokens
etc.
302             Note below that BANK_BRANCHES is dynamic and depends on
the 303             actual zipcode for this particular user and is
evaluated at 304             runtime for each user -->
305             <FINAL_RECIPIENTS> // this can be defined in XML as well
306
                email_address::favorite_color::zip_code::bank_branches
307                 frank@strongmail.com::blue::94131::##BANK_BRANCHES##
308
                shirish@strongmail.com::red::90065::##BANK_BRANCHES##
309             </FINAL_RECIPIENTS>
```

In this example, line 305 is the opening tag line for FINAL_RECIPIENTS and line 309 is the closing tag line. Line 306 defines the data structure of the e-mail addresses that follow. Line 306 states that each line of data to follow, up to the end of the FINAL_RECIPIENTS tag on line 309, has four data elements: (i) e-mail address, (ii) the favorite color of the the first name of a recipient 206 that is obtained from customer relationship management database 70 in accordance with the static token found at line 115. Note that a particular "% fname %" is matched up with a particular address using, for example, code line 203. In accordance with line 171 of the exemplary electronic request, the next line of the encoded message says "Your account ID is ##CRM_ACCOUNT_ID##" where "##CRM_ACCOUNT_ID##" is the account identifier associated with the recipient 206 (mapped from [% CID %] of the encoded message. The value "[% cid"%]" is obtained from the personalization of the CRM system, then mapped to ##CRM_ACCOUNT_ID## using the static token found at line 117 and is matched up with a particular address using code such as, for example, line 203 in conjunction with lines 114-117 of the exemplary EXML message.

In accordance with line 172 of the exemplary electronic request, the next line of the encoded message states "Your favorite color is ##favorite_color##" where the phrase ##favorite_color## is the color associated with the address to which the encoded message is being sent, as defined within the FINAL_RECIPIENTS tag on lines 154 through 159 of the exemplary electronic request. For example, when an encoded message is being sent to frank@strongmailsystems.com, the E-message will state "Your favorite color is blue."

In accordance with line 174 of the exemplary electronic request, the encoded message will then have an opening statement. This opening statement can be one or more form statements that are inserted in all encoded messages sent by MTA module 246. The ##OPENTAG## variable is recognized by MTA module 246 and/or message personalization module 244 and the text associated with this variable is inserted into outgoing encoded messages.

As illustrated in the exemplary electronic request, a wide assortment of customization rules can be executed. Lines 177 through 181 use a conditional if statement to customize the outgoing encode message as a function of the recipient's favorite color. The recipient's favorite color is obtained from the data nested within the FINAL_RECIPIENTS tag of the exemplary electronic request (lines 154-159). If the recipient's favorite color is blue, then the outgoing encoded message will contain the image "blue.gif." Otherwise, the outgoing encoded message will contain the image "transparent.gif." Lines 177 through 181 illustrate how the systems and the methods of the present invention allow for the use of logic expressions in electronic requests in order to construct highly customized encoded messages.

Next, line 183 of the exemplary electronic request instructs MTA 246 to incorporate in outgoing encoded messages a listing of branches near the recipient 206 of the encoded message. To provide this listing, the dynamic token ##BANK_BRANCHES## is populated by firing the SQL query defined by lines 137 through 143 with the zip code associated with the recipient of the encoded message as defined in the FINAL_RECIPIENTS tag on lines 154 through 159 of the exemplary electronic request.

Next, line 185 of the exemplary electronic request instructs MTA 246 to incorporate in outgoing encoded messages the weather in the geographic location associated with the recipient of the encoded message. To provide this information, the HTTP request defined by lines 145-147 of the exemplary code is made such that the token ##ZIP_CODE## within the HTTP request is populated with the zip code associated with the recipient of the encoded message as defined in the FINAL_RECIPIENTS tag on lines 154 through 159 of the exemplary electronic request. The token "##WEATHER##" is a dynamic token and line 185 illustrates how such a token can be used.

Finally, the encoded message is terminated with closing information defined by ##CANSPAN##, which is a predefined token provided by MTA module 246 on server 202. Here, the CANSPAN token is used to provide a footer that brings the outgoing encoded message in compliance with the CAN-SPAM Act of 2003 or any related legislation including updates to the CAN-SPAM Act.

In some embodiments in accordance with the present invention, a user may utilize embedded tokens in an electronic request to obtain customized data from different resources. In some embodiments a menu choice, such as those observed for a typical My Yahoo interface, so that the user may choose to include relevant information by selecting to turn on one or more of the token features, which are then incorporated into the electronic request. In other words, in some embodiments of the present invention, a graphical user interface that includes menu choices may be employed by a user in order to construct an electronic request.

In some embodiments in accordance with the present invention, the electronic request may be sent from one computer to one or more other computers. For example, client 10 may be a part of the built-in computer system associated with a refrigeration unit that sends out electronic request in response to certain events, e.g., the quantity of milk supply in the refrigerator. When the milk supply drops below a predetermined level, client 10 originates and sends out an electronic request. The electronic request is sent to, for example, exml@xyz.com, the address of module 244. Module 244 interprets the electronic request and sends an encoded message to the final recipient. Module 244 is hosted by server 202. In some embodiments, server 202 hosts a website of a grocery store and has access to one or more grocery databases. Module 244 parses the electronic request and extracts relevant information out of the grocery databases to generate an encoded message to be posted on the web site or a separate grocery store database (e.g., recipient 206). Product delivery may be arranged accordingly. Alternatively, module 244 parses the electronic request and extracts the relevant information out of the grocery database to generate an encoded message that gets sent back to client 10 to compile a grocery list. The encoded message contains, for example, price and product information for milk products that are available at the grocery store. In some embodiments, the encoded message also contains additional produce or food or non-food product information that is relevant to the product inquiry (e.g., information on cheese or yogurt products may accompany a milk shortage warning message).

In some embodiments in accordance with the present invention, electronic requests may be sent from a person for use by a recipient that is a computer itself, as opposed to a person that has access to the computer. Correspondingly, in some embodiments, the originator of an electronic request in some embodiments of the present invention is a computer, as in the refrigerator example above, not a person, and, in such embodiments, the intended recipient is one or people or one or more computers. To illustrate one such embodiment, a blog owner may program a client 10 so that it automatically sends out electronic requests of the present invention to the computer system that hosts the blog (e.g., recipient 206). The electronic request may contain tokens that correspond to, for example, the account ID of the blog owner and topic and general interest information of the blog. In some embodiments, the electronic request is parsed by module 244 of recipient system 206 to generate encoded messages that will be posted accordingly on the blog site. Alternatively, electronic requests may be sent from the computer system that maintains the blog site to one or more blog owners. Such electronic requests contain tokens that correspond to, for example, the account ID of the blog owner and topic and general interest information of the blog. Appropriate information may be retrieved from the Internet and composed into encoded messages to each blog user.

In some embodiments in accordance with the present invention, electronic requests may be used to retrieve additional information (e.g., getting contents for maps, providing driving and weather information). For example, a traveler 10 may send an electronic request to a database server 202 to request a road map or driving and weather information of the traveling destination. The server parses the request, supplies the appropriate information (e.g., step 316), and returns the information as encoded messages back to the traveler (e.g., step 318). In some embodiments in accordance with the present invention, additional modules may be added to the message personalization module (e.g., component 244) such that the returned encoded messages may be converted to voice mails. Exemplary text-voice conversion tools include the voice extensible markup language (VoiceXML). VoiceXML is designed for creating audio dialogs that feature synthesized speech, digitized audio, recognition of spoken and dual-tone-multi-frequency (DTMF) key input, recording of spoken input, telephony, and mixed initiative conversations. A goal of VoiceXML is to bring the advantages of web-based development and content delivery to interactive voice response applications.

The exemplary electronic request provided above illustrates the advantages of the present invention. The XML language used in the exemplary electronic request is used to define a data structure that is delivered to batch e-mail personalization server 202. The electronic requests contain all the instructions necessary to obtain encoded messages including both the data and the body of the message to be sent. Highly customized SQL queries can be encoded in the electronic request. Once constructed, the need to have an IT specialist involved in future communication is obviated. A business development professional simply refines the existing XML code of a previous EXML mailing.

Many examples of logic that can be encoded in the electronic requests of the present invention have been described. Further examples of logic that can be included in electronic requests include control structures such as selectional structures (e.g., if, conditional assignment, switch) and/or looping constructs (e.g., while, for, break and continue). For more description of such logic see *The Essentials of C++*, Research & Education Association, Piscataway, New Jersey, 1999, which is hereby incorporated herein by reference in its entirety. Other examples of logic that can be embedded in the electronic requests of the present invention include the seven basic logic gates: AND, OR, XOR, NOT, NAND, NOR, XNOR, and any combination of two or more of these gates.

Still other examples of logic that can be embedded in the electronic requests of the present invention is symbolic logic such as propositional calculus. The most basic units in propositional calculus are whole propositions or statements, each of which is either true or false. Propositional calculus is used to consider the logical relationships that hold among two or three or more such statements. Individual statements are represented by using capital letters of the alphabet as statement constants. Thus, for example, the letters A, B, and C can be used to represent three different statements (e.g., A could stand for "Alan bears an uncanny resemblance to Jonathan," B could stand for "Betty enjoys watching John cook," and C could stand for "Chris and Lloyd are an unbeatable team." Each statement constant designates one and only one statement. In propositional calculus statement variables are represented with lower-case letters of the alphabet (beginning with "p"), for example, "Consider any statement, p, . . . " or "Suppose that some pair of statements, p and q , are both true . . . ." Statement variables can stand for any statements whatsoever, but within the scope of a specific context, each statement variable always designates the same statement. Once A is substituted for p, for example, the substitution must done consistently; that is, every occurrence of p must be taken to refer to A. But if another variable, q, occurs in the same context, it can stand for any statement whatsoever—B , or C , or even A.

In the propositional calculus that can be implemented in the electronic messages of the present invention, the following exemplary statement connectives or operators can be used:

~ p
• (also symbolized as & or ˆ)
v
⊃ (also symbolized as →)
≡ (also symbolized as ↔)

The syntax of using statement connectives to form new, compound statements can be stated as a simple rule:

For any statements, p and q,

~p
p·q
pvq
p ⊃ q and
p≡q are all legitimate compound statements.

This rule is recursive in the sense that it can be applied to its own results in order to form compounds of compounds of compounds . . . , etc. As these compound statements become more complex, parentheses and brackets can be used, just as in the case of algebra, in order to keep track of the order of operations. Thus, since A, B, and C are all statements, so are all of the following compound statements:

~A
A·B
Av~C
C ⊃ (BvA)
~(~B≡C)
(Av~B)≡(C ⊃ A)
[Av~(CvB)]

The five logical operators are all truth-functional connectives; the truth or falsity of each compound statement formed by using them is wholly determined by the truth-value of the component statements and the meaning of the connective. Thus, using statement variables in order to cover every possible combination of truth-values (T or F), a convenient truth-table can be constructed to define the meaning of each statement connective.

Negation. The "~" signifies logical negation; it reverses the truth value of any statement (simple or compound) in front of which it appears: if the original is true, the ~ statement is false, and if the original is false, the ~ statement is true. Thus, its meaning can be represented by the following truth-table:

| p | ~p |
|---|----|
| T | F  |
| F | T  |

Conjunction. The "·" symbolizes logical conjunction; a compound statement formed with this connective is true only if both of the component statements between which it occurs are true. Whenever either of the conjuncts (or both) is false, the whole conjunction is false. Thus, the truth-table below shows the truth-value of a compound · statement for every possible combination of truth-values for its components:

| p | q | p.q |
|---|---|-----|
| T | T | T |
| T | F | F |
| F | T | F |
| F | F | F |

Disjunction. The symbol "v" signifies inclusive disjunction: a v statement is true whenever either (or both) of its component statements is true; it is false only when both of them are false as set forth in the truth table below:

| p | q | p q |
|---|---|-----|
| T | T | T |
| T | F | T |
| F | T | T |
| F | F | F |

Implication. The ⊃ symbol is used to symbolize a relationship called material 5 implication; a compound statement formed with this connective is true unless the component on the left (the antecedent) is true and the component on the right (the consequent) is false, as shown in the following truth-table:

| p | q | p ⊃ q |
|---|---|-------|
| T | T | T |
| T | F | F |
| F | T | T |
| F | F | T |

Equivalence. Finally, the "≡" is used to symbolize material equivalence, in which the compound statement is true only when its component statements have the same truth-value—either both are true or both are false as shown in the following truth table:

| p | q | p ≡ q |
|---|---|-------|
| T | T | T |
| T | F | F |
| F | T | F |
| F | F | T |

The present invention can be implemented as a computer program product that comprises a computer program mechanism embedded in a computer readable storage medium. For instance, the computer program product could contain the program modules shown in FIG. 3 and/or FIG. 4. These program modules can be stored on a CD-ROM, DVD, magnetic disk storage product, or any other computer readable data or program storage product. The program modules can also be embedded in permanent storage, such as ROM, one or more programmable chip, or one or more application specific integrated circuits (ASICs). Such permanent storage can be localized in a server, 802.11 access point, 802.11 wireless bridge/station, repeater, router, mobile phone, or other electronic devices. The software modules in the computer program product can also be distributed electronically, via the Internet or otherwise, by transmission of a computer data signal (in which the software modules are embedded) either digitally or on a carrier wave.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed:

1. A first computer comprising a processor and a memory, the memory comprising instructions, executable by the processor, for:
   receiving, at the first computer, a human-readable message over a network or the Internet from a second computer, wherein the human-readable message is in the form of an e-mail;
   determining, at the first computer, whether that human-readable message includes (i) a tag originated by a sender of the human-readable message that is associated with the second computer, wherein the tag identifies the human-readable message as a message that is to be pre-processed prior to forwarding by the first computer to a plurality of recipients and (ii) human-readable instructions, originated by the sender of the human-readable message that is associated with the second computer, wherein the human-readable instructions are interpretable by the first computer to direct that first computer to pre-process the human-readable message by a pre-process routine, the pre-process routine including instructions for:
   requesting and receiving, over a network or the Internet from a third computer, data from one or more data fields of a database responsive to the human-readable instructions and without human intervention, that data from those one or more data fields each being associated with said plurality of recipients of that human-readable message;
   modifying that human-readable message, responsive to the human-readable instructions and without human intervention, to include human-readable versions of that data from those one or more data fields thereby creating a plurality of processed human-readable messages; and
   forwarding the plurality of processed human-readable messages over a network or the Internet to a plurality of fourth computers, each fourth computer in the plurality of fourth computers associated with at least one recipient in the plurality of recipients;
   wherein one or more of those human-readable instructions is interpretable by the first computer to direct the first computer
   to conditionally conduct a change in flow of control by those human-readable instructions, in response to a comparison, by the first computer, of a value of that data from those one or more data fields with one or more human-readable data values in that human-readable message, thereby causing each of the plurality of human-readable messages to have different data from the database that is uniquely associated with a respective recipient in the plurality of recipients; and
   when it is determined that the human-readable message includes (i) a tag and (ii) human-readable instructions, pre-processing the human-readable message in accordance with the human-readable instructions using the pre-process routine.

2. The first computer of claim 1, wherein one or more of those human-readable instructions in that human-readable message is interpretable by the first computer to direct the first computer to perform a looping construct, that looping construct being responsive to that data from those one or more data fields.

3. The first computer of claim 1, wherein
one or more of those human-readable instructions in that human-readable message is interpretable by the first computer to direct the first computer
to send a database query or web services request over a network or the Internet to the third computer; and
to receive a response to that database query or web services request from the third computer over a network or the Internet;
wherein at least a portion of that database query or web services request directs that third computer to modify its database.

4. A physical medium maintaining human-readable instructions interpretable by a first computer to direct the first computer:
to receive at the first computer a human-readable message over a network or the Internet from a second computer, wherein the human-readable message is in the form of an e-mail;
to determine, at the first computer, whether that human-readable message includes (i) a tag originated by a sender of the human-readable message that is associated with the second computer, wherein the tag identifies the human-readable message as a message that is to be pre-processed by the first computer prior to forwarding by the first computer to a plurality of recipients and (ii) human-readable instructions, originated by the sender of the human readable message that is associated with the second computer, wherein the human-readable instructions are interpretable by the first computer to direct that first computer device to pre-process the human-readable message by a pre-process routine, the pre-process routine including instructions for:
requesting and receiving at the first computer, over a network or the Internet from a third computer, data from one or more data fields of a database responsive to the human-readable instructions and without human intervention, that data from those one or more data fields each being associated with recipients of that human-readable message;
modifying that human-readable message, responsive to the human-readable instructions and without human intervention, to include human-readable versions of that data from those one or more data fields thereby creating a plurality of processed human-readable messages; and
forwarding the plurality of processed human-readable messages over a network or the Internet to a plurality of fourth computers from the first computer, wherein each fourth computer in the plurality of fourth computers is associated with at least one recipient in the plurality of recipients;
wherein one or more of those human-readable instructions is interpretable by that first computer to direct that first computer
to conditionally conduct a change in flow of control by those human-readable instructions, in response to a comparison, by the first computer, of a value of that data from those one or more data fields with one or more human-readable data values in that human-readable message, thereby causing each of the plurality of human-readable messages to have different data from the database that is uniquely associated with a respective recipient in the plurality of recipients; and
when it is determined that the human-readable message includes (i) a tag and (ii) human-readable instructions, to pre-process the human-readable message in accordance with the human-readable instructions using the pre-process routine.

5. A physical medium as in claim 4, wherein one or more of those human-readable instructions in that human-readable message is interpretable by the first computer to direct the first computer to perform a looping construct, that looping construct being responsive to that data from those one or more data fields.

6. A physical medium as in claim 4, wherein
one or more of those human-readable instructions in that human-readable message is interpretable by the first computer to direct the first computer
to send a database query or web services request to said third computer; and
to receive a response to that database query or web services request from said third computer;
wherein at least a portion of that database query or web services request directs said third computer to modify its database.

7. A first computer for distributing a plurality of encoded messages to a corresponding plurality of recipients, the first computer comprising a processor and a memory, the memory comprising instructions, executable by the processor, for:
(A) receiving, at the first computer, a human-readable electronic request over a network or the Internet from a second computer using an e-mail protocol;
(B) determining, at the first computer, whether said electronic request includes:
(i) a tag originated by a sender of the human-readable electronic request that is associated with the second computer, wherein the tag identifies the electronic request as a message that is to be pre-processed by the first computer prior to forwarding by the server computer to the plurality of recipients;
(ii) instructions for accessing a plurality of destinations corresponding to said plurality of recipients; and
(iii) conditional logic for accessing data over a data network or the Internet relating to recipients in said plurality of recipients from one or more data fields of a database on a third computer, that data from those one or more data fields each being associated with said plurality of recipients; and
(C) when it is determined that said electronic request includes (i) a tag, (ii) instructions for accessing a plurality of destinations, and (iii) conditional logic, pre-processing said electronic request by:
(1) obtaining, over a network or the Internet from said third computer, said data relating to recipients in said plurality of recipients from said database using said conditional logic for accessing said data;
(2) formatting, for each respective recipient in said plurality of recipients, a message body of a message corresponding to said respective recipient using said data relating to said respective recipient obtained in step (1) without human intervention and responsive to said conditional logic thereby constructing said plurality of encoded messages, wherein each encoded message in the plurality of encoded messages has different data from the database that is uniquely associated with a respective recipient in the plurality of recipients; and
(3) distributing each respective encoded message in said plurality of encoded messages from the first computer over a network or the Internet to a corresponding fourth computer that is associated with a recipient in said plurality of recipients using a corresponding destination in said plurality of destinations.

8. The first computer of claim 7, wherein the conditional logic for accessing said data comprises instructions for sending a request for said data to said third computer over a data network or the Internet.

9. The first computer of claim 8, wherein the instructions for sending a request comprise an SQL query or web service request.

10. The first computer of claim 7, wherein the data is update information.

11. The first computer of claim 7, wherein the e-mail protocol is the simple mail transfer protocol (SMTP), the X.400 International Telecommunication Union standard (X.400), the Novell message handling service (MHS), or the extended simple mail transfer protocol (ESMTP).

12. The first computer of claim 7, wherein the electronic request comprises an extensible markup language tag.

13. The first computer of claim 7, wherein the data relating to recipients in said plurality of recipients comprises customer data.

14. The first computer of claim 7, wherein the database comprises a customer relationship management database, an enterprise resource planning database, a human resource database, or a supply chain database.

15. The first computer of claim 7, wherein the data relating to said plurality of recipients comprises customer data, and said conditional logic for accessing the data comprises the customer data itself.

16. The first computer of claim 7, wherein the data relating to said plurality of recipients is secure and the electronic request includes access rights to retrieve the data.

17. The first computer of claim 7, wherein the instructions for accessing said plurality of destinations comprises a list of e-mail destinations that is encoded within said electronic request.

18. The first computer of claim 7, wherein said conditional logic for accessing the data comprises an SQL query statement that specifies the name of a database, a database account login, and a database query.

19. The first computer of claim 7, wherein said conditional logic for accessing the data includes an HTTP request.

20. The first computer of claim 7, wherein the conditional logic for accessing the data comprises a selectional structure or a looping construct.

21. The first computer of claim 7, wherein the conditional logic for accessing the data comprises a gate selected from the group consisting of AND, OR, XOR, NOT, NAND, NOR, and XNOR.

22. The first computer of claim 7, wherein the conditional logic for accessing the data comprises a propositional calculus logical operator selected from the group consisting of negation, conjunction, disjunction, implication, and equivalence.

23. The first computer of claim 7, wherein the electronic request is an e-mail message and wherein the instructions for accessing said plurality of destinations and/or the conditional logic for accessing data is in the body of the e-mail message.

24. The first computer of claim 7, wherein the electronic request is an e-mail message and wherein the instructions for accessing said plurality of destinations and/or the conditional logic for accessing data is in an attachment to the e-mail message.

25. The first computer of claim 7, wherein the electronic request is an e-mail message and wherein the instructions for accessing said plurality of destinations is obtained from a header of the e-mail.

26. A computer program product for use in conjunction with a first computer, the computer program product comprising a non-transitory computer readable storage medium and a computer program mechanism embedded therein, the computer program mechanism comprising instructions for:
(A) receiving, at the first computer, a human-readable electronic request over a network or the Internet using an e-mail protocol;
(B) determining, at the first computer, whether said electronic request includes:
(i) a tag originated by a sender of the human-readable electronic request that is associated with a second computer, wherein the tag identifies the electronic request as a message that is to be pre-processed by the first computer prior to forwarding by the first computer to a plurality of recipients;
(ii) instructions for accessing a plurality of destinations corresponding to the plurality of recipients; and
(iii) conditional logic for accessing data relating to recipients in said plurality of recipients from one or more data fields of a database on a third computer, that data from those one or more data fields each being associated with said plurality of recipients; and
(C) when it is determined that said electronic request includes (i) a tag, (ii) instructions for accessing a plurality of destinations, and (iii) conditional logic, pre-processing said electronic request by:
(1) obtaining, over a network or the Internet from said third computer, said data relating to recipients in said plurality of recipients from said database using said conditional logic for accessing said data;
(2) formatting, for each respective recipient in said plurality of recipients, a message body of a message corresponding to said respective recipient using said data relating to said respective recipient obtained by said obtaining (1) without human intervention and responsive to said conditional logic thereby constructing a plurality of encoded messages, wherein each encoded message in the plurality of encoded messages has different data from the database that is uniquely associated with a respective recipient in the plurality of recipients; and
(3) distributing each encoded message in said plurality of encoded messages from the first computer over a network or the Internet to a corresponding fourth computer associated with a recipient in said plurality of recipients using a corresponding destination in said plurality of destinations.

27. The computer program product of claim 26, wherein the conditional logic for accessing said data comprises instructions for sending a request to said second computer for said data.

28. The computer program product of claim 27, wherein the instructions for sending a request comprise an SQL query or web service request.

29. The computer program product of claim 26, wherein the data is update information.

30. The computer program product of claim 26, wherein the e-mail protocol is the simple mail transfer protocol (SMTP), the X.400 International Telecommunication Union standard (X.400), the Novell message handling service (MHS), or the extended simple mail transfer protocol (ESMTP).

31. The computer program product of claim 26, wherein the electronic request comprises an extensible markup language tag.

32. The computer program product of claim 26, wherein the data relating to recipients in said plurality of recipients comprises customer data.

33. The computer program product of claim 26, wherein the database comprises a customer relationship management database, an enterprise resource planning database, a human resource database, or a supply chain database.

34. The computer program product of claim 26, wherein the data relating to said plurality of recipients comprises customer data, and said conditional logic for accessing the data comprises the customer data itself.

35. The computer program product of claim 26, wherein the data relating to said plurality of recipients is secure and the electronic request includes access rights to retrieve the data.

36. The computer program product of claim 26, wherein the instructions for accessing said plurality of destinations comprises a list of e-mail destinations that is encoded within said electronic request.

37. The computer program product of claim 26, wherein said conditional logic for accessing the data comprises an SQL query statement that specifies the name of a database, a database account login, and a database query.

38. The computer program product of claim 26, wherein said conditional logic for accessing the data includes an HTTP request.

39. The computer program product of claim 26, wherein the conditional logic for accessing the data comprises a selectional structure or a looping construct.

40. The computer program product of claim 26, wherein the conditional logic for accessing the data comprises a gate selected from the group consisting of AND, OR, XOR, NOT, NAND, NOR, and XNOR.

41. The computer program product of claim 26, wherein the conditional logic for accessing the data comprises a propositional calculus logical operator selected from the group consisting of negation, conjunction, disjunction, implication, and equivalence.

42. The computer program product of claim 26, wherein the electronic request is an e-mail message and wherein the instructions for accessing said plurality of destinations and/or the conditional logic for accessing data is in the body of the e-mail message.

43. The computer program product of claim 26, wherein the electronic request is an e-mail message and wherein the instructions for accessing said plurality of destinations and/or the conditional logic for accessing data is in an attachment to the e-mail message.

44. The computer program product of claim 26, wherein the electronic request is an e-mail message and wherein the instructions for accessing said plurality of destinations is obtained from a header of the e-mail message.

* * * * *